(No Model.)
G. H. FLINT.
GRAIN ADJUSTER.
No. 438,129. Patented Oct. 7, 1890.
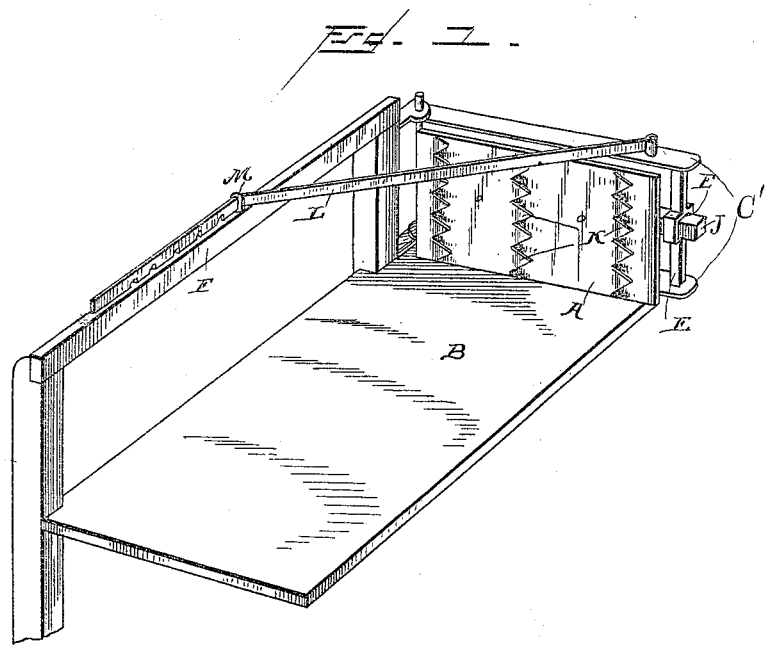
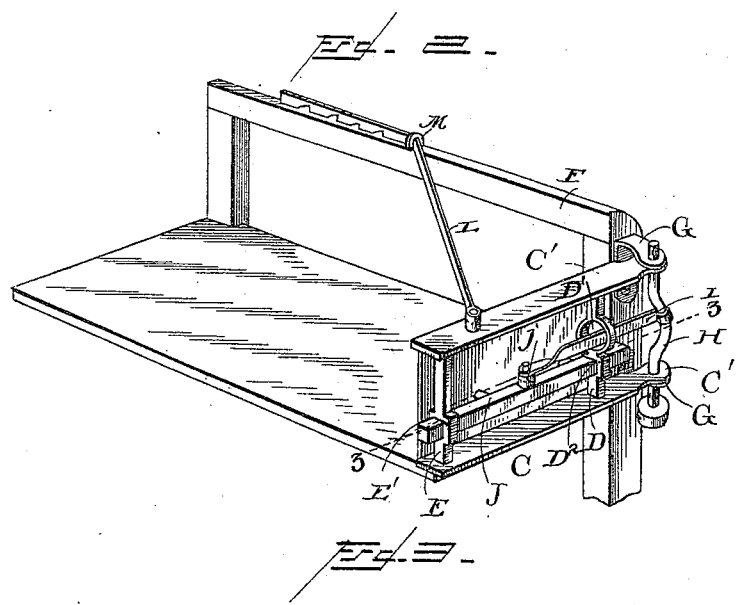
WITNESSES
A. J. Schwartz
J. F. Reily
G. H. Flint
INVENTOR
By W. T. Fitzgerald
Attorney
THE NORRIS PETERS CO., PHOTO-LITHO., WASHINGTON, D. C.

UNITED STATES PATENT OFFICE.

GEORGE HENESY FLINT, OF LODI, WISCONSIN, ASSIGNOR OF ONE-HALF TO OTTO HAYEN HINRICHS, JR., OF SAME PLACE.

GRAIN-ADJUSTER.

SPECIFICATION forming part of Letters Patent No. 438,129, dated October 7, 1890.

Application filed June 12, 1890. Serial No. 355,117. (No model.)

*To all whom it may concern:*

Be it known that I, GEORGE HENESY FLINT, a citizen of the United States, residing at Lodi, in the county of Columbia and State of Wisconsin, have invented certain new and useful Improvements in Grain-Adjusters; and I do hereby declare the following to be a full, clear, and exact description of the invention, such as will enable others skilled in the art to which it appertains to make and use the same.

My invention consists in a new and improved grain-adjuster for self-binding harvesters; and the invention will be hereinafter fully described and claimed.

Referring to the accompanying drawings, Figure 1 is a perspective front view of my new and improved grain-adjuster. Fig. 2 is a perspective rear view of the same, and Fig. 3 is a longitudinal sectional view taken on line 3 3 of Fig. 2.

The same letters of reference indicate corresponding parts in all the figures.

Referring to the several parts by letter, A indicates my vibrating adjusting-board, which is arranged in a vertical position at the end of the harvester-table B, where the endless apron delivers the cut grain in the usual position for adjusting-boards of this class.

The adjusting-board is movably mounted in a frame C, which consists of two horizontal parallel side pieces C' C', connected near their inner ends by an end piece or cross-bar D, and connected at their outer ends by a cross-bar E.

The frame C is adjustably mounted in a vertical position between two brackets G G on the crank-shaft H, which passes through the rear ends of the side pieces C' C' and the ends of the said brackets, as shown. The crank of this shaft H is connected by a short pitman I with the adjusting-board, the outer end of the pitman being pivoted to the side of a guide-bar J. The adjusting-board A is secured to or mounted on this guide-bar, as most clearly shown in the sectional view, Fig. 3, the ends of the guide-bar playing through openings E' D² in the cross-bars E and D, while the pitman I plays freely through a large opening D' in the bar D.

The inner or operative side of the adjusting-board is provided with transverse rows K of teeth or projections.

It will now be seen that, in operation, as the crank-shaft H is revolved through suitable gearing with some revolving part of the harvester it will, through the pitman I, vibrate the board A back and forth, and that the said vibrating board will "even up" the ends of the cut grain, while its rows of teeth K will operate to feed the grain onto the table of the harvester, where it is bound.

To the upper side of the frame C, near its free end, is pivoted the end of a rack-bar L, which passes through a bail M, secured on the frame or bracket F. By means of this construction I can readily and in an instant adjust the vibrating board at any angle desired, swinging the pivoted board by means of the handle-bar or rack-bar L, and securing it at the position or angle to which it is adjusted by engaging the teeth of the rack-bar with the under side of the bail M.

It will be seen from the foregoing that my new and improved grain-adjuster for harvesters is simple, strong, and durable in construction; that it is very efficient in its operation, and that it can be readily adjusted at any angle desired, which is a most important advantage.

Having thus described my invention, what I claim, and desire to secure by Letters Patent, is—

1. The combination, in a grain-adjuster, of the frame consisting of the side pieces C' C', the cross-bar E, formed with the opening E', and the cross-bar D, formed with the openings D' and D², the guide-bar J, the adjusting-board mounted on the said bar, and the crank-shaft and connecting-pitman, substantially as set forth.

2. The combination, in a grain-adjuster, of the brackets G, the frame, consisting of the side pieces C' C', the cross-bar E, having the opening E', and the cross-bar D, formed with the openings D' and D², the vibrating board having the series of teeth, the guide-bar J, the crank-shaft and the connecting-pitman, the rack-bar L, pivoted to the free end of the frame C, and the bail M, substantially as set forth.

In testimony whereof I affix my signature in presence of two witnesses.

GEORGE HENESY FLINT.

Witnesses:
MELVIN PADLEY,
MICHEAL HART.